No. 684,670. Patented Oct. 15, 1901.
G. BOEHMLER.
PROCESS OF BRAZING TUBES.
(Application filed Feb. 9, 1901.)
(No Model.)
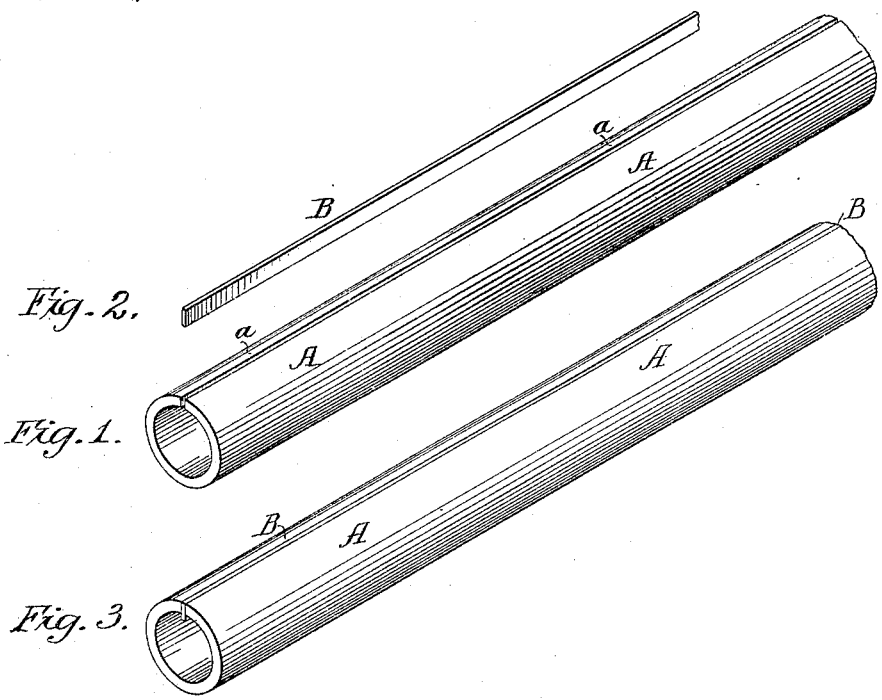
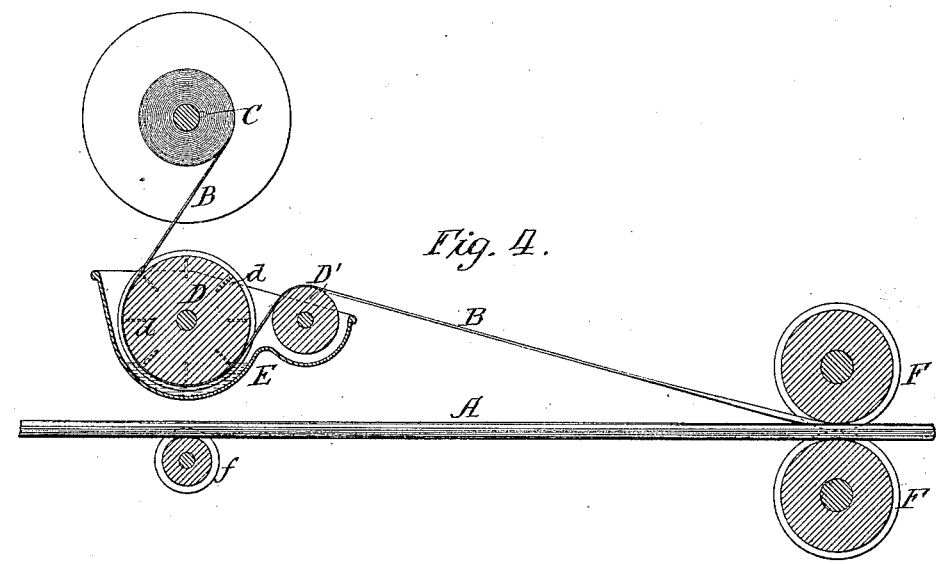
Witnesses:
Inventor:
George Boehmler
by his Attorneys,

UNITED STATES PATENT OFFICE.

GEORGE BOEHMLER, OF PHILADELPHIA, PENNSYLVANIA, ASSIGNOR TO CHARLES B. HEADLY, OF SAME PLACE.

PROCESS OF BRAZING TUBES.

SPECIFICATION forming part of Letters Patent No. 684,670, dated October 15, 1901.

Application filed February 9, 1901. Serial No. 46,705. (No specimens.)

*To all whom it may concern:*

Be it known that I, GEORGE BOEHMLER, a citizen of the United States, residing in Philadelphia, Pennsylvania, have invented certain Improvements in Processes of Brazing Tubes, of which the following is a specification.

The object of my invention is to thoroughly braze the abutting edges of tubes, especially small tubes, such as those used for umbrella-sticks.

In the accompanying drawings, Figure 1 is a perspective view of a tube before being brazed. Fig. 2 is a perspective view of a strip of metal to be inserted in the slit in the tube. Fig. 3 is a perspective view showing the strip of metal in the tube in position and the tube ready to be brazed, and Fig. 4 is a diagram view showing one method of inserting the strip in the slit in the tube.

Tubes have heretofore been prepared for brazing by mixing a preparation of borax and particles of brass together and placing this mixture on the tube at the slit, the tube being then placed in a suitable furnace and heated until the brass was melted and fluxed, making the brazed joint. This method is very unsatisfactory, especially in brazing long tubes used for umbrella-sticks and other purposes, as it often occurs that the compound is not thoroughly put on or is shaken off when handled roughly, thus leaving portions of the tube not thoroughly brazed. By my invention, however, I am enabled to thoroughly braze the tube from one end to the other without showing an open joint.

In carrying out my invention I first bend a sheet-metal strip into the form of a tube A, with an open slit *a* throughout its length, and I prepare a flat wire B, of brass or other suitable material. This wire is of a proper thickness to snugly fit the slit *a* in the tube A. The wire can be placed in the slit in any suitable manner after it has been coated or immersed in a borax solution or other suitable flux. When the brass wire coated with flux is in the slit in the tube, as shown in Fig. 3, such tube can be handled roughly without displacing the flux and the tubes do not have to be straightened before being brazed, an essential step in all former methods of brazing tubes.

One form of apparatus for inserting the brass strip in the slit in the tube is shown in Fig. 4, in which C is a reel, upon which the flat wire is coiled. The wire B passes from this coil around a wheel D, which is in a receptacle E, containing the solution of borax. The wheel in the present instance has a series of blades *d* at the side for stirring the borax, so that it is always in condition to be taken up by the metal strip B as it passes around the wheel and into the solution. The strip then passes over a guide-wheel D' to a pair of rolls F F. These rolls are shaped to conform to the tube A, which rests on one or more guide-rolls *f*.

In placing the strip of metal in the slit in the tube the operator forces the end of the wire into the slit by hammering or otherwise and then draws the tube through the rolls F F, which force the strip into the slit in the tube as the tube is drawn through the rolls, the strip being drawn through the flux in the reservoir E at the same time. Thus it will be seen that the strip B is thoroughly coated with the compound before it is forced into the slit in the tube. After it has been forced in place there is sufficient friction to hold the strip in position in the tube during the handling of the same and while it is being brazed in the furnace, thus making a substantial brazed joint without any breaks.

The tube after being brazed can be finished in the ordinary manner.

I claim as my invention—

1. The process herein described of brazing split metal tubes, said process consisting in first preparing a flat wire of a thickness equal to the width of the slit in the tube, second, passing the said wire through a solution of suitable fluxing material, third, forcing the wire into the slit in the tube by passing said tube and wire simultaneously through a suitable pressure apparatus, and finally heating said tube until the metal flows and forms the brazed joint, substantially as described.

2. The process herein described of brazing split metal tubes, said process consisting in first preparing a flat wire of a thickness equal to the width of the slit in the tube, second, passing the said wire through a solution of suitable fluxing material, third, securing one end of the wire in the slit in the tube, fourth, drawing the tube and wire through a pressure device which will force the wire into the slit in the tube, and finally heating said tube until the metal flows and forms the brazed joint, substantially as described.

In testimony whereof I have signed my name to this specification in the presence of two subscribing witnesses.

GEORGE BOEHMLER.

Witnesses:
  WILL. A. BARR,
  JOS. H. KLEIN.